United States Patent
Song et al.

(10) Patent No.: US 7,054,240 B2
(45) Date of Patent: May 30, 2006

(54) METHOD AND APPARATUS FOR PROVIDING FOCUS CONTROL ON A MULTI LAYER DISC

(75) Inventors: Hubert Song, Sunnyvale, CA (US); Hwee Chin Ong, Sunnyvale, CA (US)

(73) Assignee: Zoran Corporation, Sunnyvale, CA (US)

( * ) Notice: Subject to any disclaimer, the term of this patent is extended or adjusted under 35 U.S.C. 154(b) by 455 days.

(21) Appl. No.: 10/090,934

(22) Filed: Mar. 4, 2002

(65) Prior Publication Data

US 2003/0165092 A1 Sep. 4, 2003

(51) Int. Cl.
*G11B 7/00* (2006.01)

(52) U.S. Cl. .................. 369/44.29; 369/94; 369/53.22; 369/44.26

(58) Field of Classification Search ............. 369/44.25, 369/44.26, 44.36, 44.37, 44.41, 53.1, 53.2, 369/94, 53.22, 44.35, 44.29
See application file for complete search history.

(56) References Cited

U.S. PATENT DOCUMENTS

| 4,505,585 A | 3/1985 | Yoshikawa et al. |
| 4,799,206 A | 1/1989 | Imanaka |
| 4,954,723 A | 9/1990 | Takahashi et al. |
| 5,256,965 A | 10/1993 | Nomura |
| 5,321,675 A | 6/1994 | Ito et al. |
| 5,623,465 A | 4/1997 | Sasaki et al. |
| 5,682,307 A | 10/1997 | Sasaki et al. |
| 5,818,804 A | 10/1998 | Obata et al. |
| 5,835,460 A * | 11/1998 | Nishikata ................. 369/44.27 |
| 6,005,832 A * | 12/1999 | Kumagai ................. 369/44.27 |
| 6,147,942 A * | 11/2000 | Abe et al. ................. 369/44.27 |
| 6,188,657 B1 | 2/2001 | Kim et al. |
| 6,282,157 B1 | 8/2001 | Kim et al. |
| 6,480,445 B1 | 11/2002 | Yun et al. |
| 6,584,048 B1 * | 6/2003 | Tateishi et al. .......... 369/44.28 |
| 6,654,329 B1 | 11/2003 | Kondo et al. |
| 6,862,088 B1 | 3/2005 | Song et al. |
| 2001/0026508 A1 | 10/2001 | Sasaki et al. |
| 2001/0055247 A1 | 12/2001 | Tateishi et al. |

* cited by examiner

*Primary Examiner*—Nabil Hindi
(74) *Attorney, Agent, or Firm*—Blakely, Sokoloff, Taylor & Zafman LLP; Judith A. Szepesi

(57) ABSTRACT

The present invention is a method and system to provide focus control in a multi-layer optical storage medium. The method comprises generating a beam of light and reflecting the beam of light off one of a first and a second optical layers on a disk. The reflected beam is detected and a servo signal is provided in response to the reflected beam. The light source is directed to move from a first position to a second position based on the servo signal, so as to focus the light source from one of the first or the second optical layer to another one of the first or the second optical layer.

14 Claims, 5 Drawing Sheets

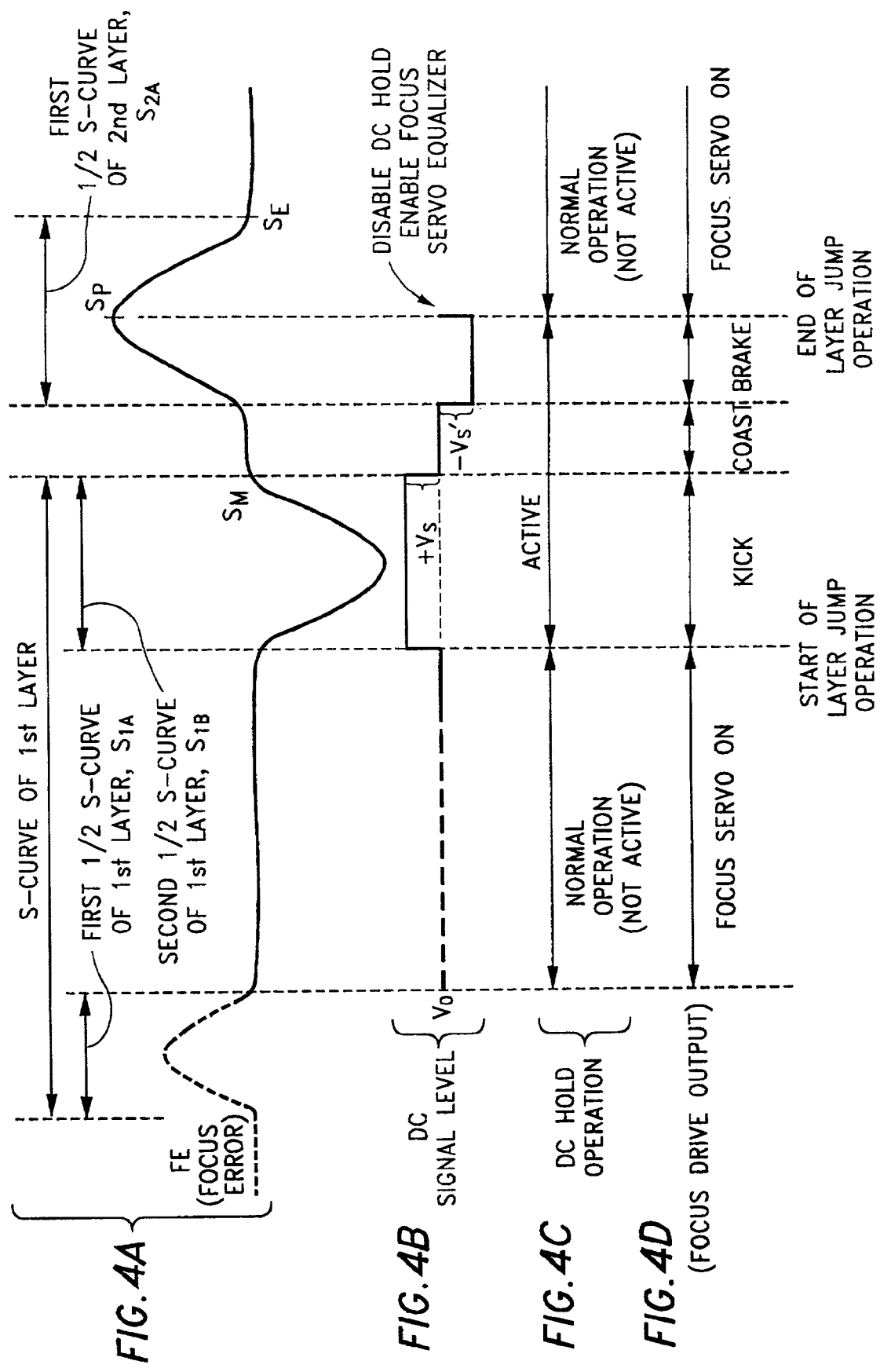

METHOD AND APPARATUS FOR PROVIDING FOCUS CONTROL ON A MULTI LAYER DISC

BACKGROUND OF THE INVENTION

1. Field of the Invention

The present invention relates in general to optical disk storage systems and more particularly, to a method and apparatus for providing focus control on a multi layer disc.

2. Description of the Related Art

In recent years, optical disk devices have been used to record or reproduce large amounts of data. Optical disks are storage mediums from which data is read and to which data is written by laser. Each optical disk can store a large amount of data, typically in the order of 6 gigabytes. Such optical disk devices are under active technical developments for achieving higher recording density.

Current rewritable optical disks include spiral-shaped groove tracks having concave and convex portions, typically referred to as pits and lands respectively, formed on the surface of a disk substrate. On the surface of the substrate, a thin film that includes a recording material as a component is attached. During fabrication of the disks, concave and convex portions are often formed on the recording surface, simultaneously with the formation of guide grooves for tracking control, so as to record address information of each sector.

Each track of the optical disk is irradiated with a light beam having a predetermined recording power, so as to form recording marks on the recording thin film. The portions irradiated with the light beam (i.e., the recording marks) have different optical characteristics (reflection characteristics) from the other portions of the recording thin film. Thus, the recorded information can be reproduced or read by irradiating the track with a predetermined reproduction power and detecting light reflected from the recording film.

Currently, dual layer optical discs are available. On the surface of the substrate, a first semi-reflective layer that includes a recording material as a component is attached. A second, reflective layer that also includes a recording material is attached to the first layer. Because the first layer is semi-reflective, the light beam irradiated onto the disk may be focused onto either the first or second layer, so as to retrieve data located on each of the layers. For example, movies are increasingly being recorded on such dual layer discs. During playback, information may be retrieved from data located on both layers of the disc. As a result, the disc controller has to switch back and forth between reading of data from both layers. To ensure minimum interruption during playback, such a dual layer jump has to be executed in the shortest possible time. Otherwise, undesired results such as delays and frozen screen effects may occur.

To read data from each of the layers, one of two approaches is typically implemented. The first approach involves moving the lens from either of the layers to a known or reset position. A normal focus search is then initiated. When the target layer is found, typically through monitoring of the focus error signal zero crossing, the focus servo is turned on. Data is then read from the target layer using the appropriate focus control. This approach involves physically moving the focusing lens to a reset position, which subjects the servo control circuitry to external disturbances. In addition, because the focusing lens has to be reset each time reading from another layer is required, the time for executing the jump is much longer than desired.

The second approach involves moving the focusing lens up or down. When lens motion is detected, the lens focusing circuitry is enabled. Like the first approach, this method requires the performance of an arbitrary and disconnected layer jump, which typically involves a delay of 100 ms or more. As a result, system performance is unnecessarily compromised.

Accordingly, there is a need in the technology to overcome the aforementioned problems.

BRIEF SUMMARY OF THE INVENTION

The present invention is a method and system to provide focus control in a multi-layer optical storage medium. The method comprises generating a beam of light and reflecting the beam of light off one of a first and a second optical layers on a disk. The reflected beam is detected and a servo signal is provided in response to the reflected beam. The light source is directed to move from a first position to a second position based on the servo signal, so as to focus the light source from one of the first or the second optical layer to another one of the first or the second optical layer.

BRIEF DESCRIPTION OF THE DRAWINGS

FIG. 4A illustrates one embodiment of the focus error (FE) signal during the interlayer jump process.

FIG. 4B illustrates one embodiment of the D.C. signal level during the interlayer jump process.

FIG. 4C illustrates one embodiment of the intervals of active application of the D.C. hold during the interlayer jump process.

FIG. 4D illustrates one embodiment of the focus drive output (output of the summing circuit 140) during the interlayer jump process.

DETAILED DESCRIPTION OF THE EMBODIMENTS

The present invention is an apparatus and methods for providing focus control when performing interlayer jumps on a multi-layer disk in an optical disk system.

Figure 1:
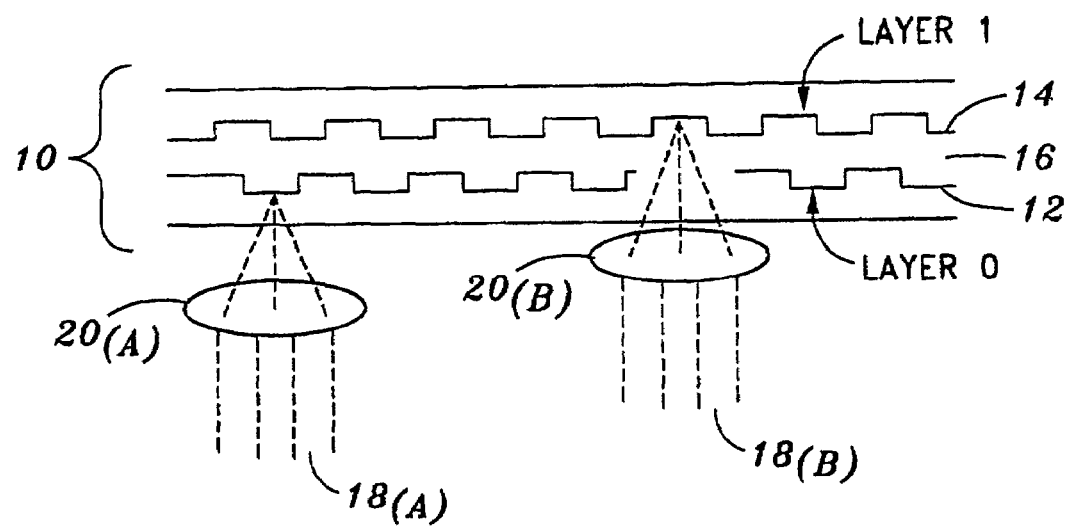
FIG. 1 illustrates one embodiment of a detailed cross section of a dual layer disc substrate, and the positions of the focusing lens when focusing on a first and a second layer.

Referring to the drawings more particularly by reference numbers, FIG. 1 illustrates one embodiment of a detailed cross section of a dual layer disc substrate, with a focusing lens in two positions. The dual layer disc 10 comprises a first layer or coating 12 (layer 0) and a second layer or coating 14 (layer 1). In one embodiment, each layer 12 and/or 14 includes a recording material as a component. During fabrication of the disks, concave and convex portions are formed on the recording surface, simultaneously with the formation of guide grooves for tracking control, so as to record address information of each sector. In another embodiment, the first layer 12 is a semi-reflective layer and the second layer 14 is a reflective layer. Between the two layers 12 and 14 is an optically transparent bonding layer 16.

A collimated laser beam 18 is focused by lens 20 onto either the first or the second layer. In particular, lens 20 may be focused on the first layer while in position A, and on the second layer while in position B.

Figure 2:
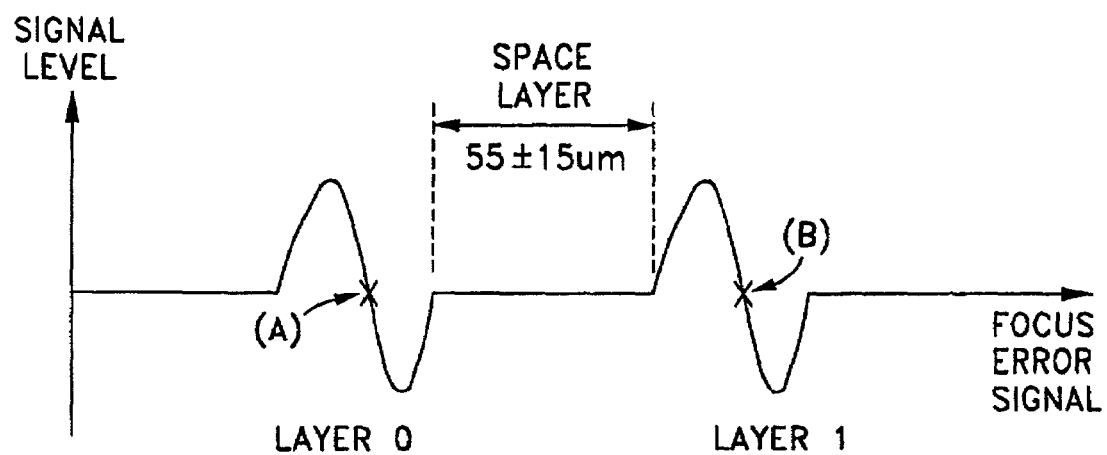
FIG. 2 illustrates one embodiment of the focus error signal obtained during ramp motion of the lens when focusing on a multi layer disc.

The light directed by the lens 20 (see FIG. 1) onto the disc substrate 10 is reflected off either of the layers 12 or 14 and detected by a photo detector (see FIG. 4), which converts the reflected light into an electric signal. A focus error signal, based on the polarity and strength of the reflected signal is generated. FIG. 2 illustrates one embodiment of the focus error signal obtained during ramp motion of the lens when focusing on two different layers on the disc. (A) marks the location of the focus error signal when the light beam 20 is substantially focused onto the first layer 12, while (B) marks the location of the focus error signal when the light beam 20 is substantially focused onto the second layer 14. The half sine waves above and/or below the zero-crossings, i.e., above and/or below (A) and/or (B) represent generally unfocused signal levels. In one embodiment, the layers 12 and 14 are separated nominally by a space of 55+/−15 m.

One aspect of the invention involves a method and apparatus for providing data or information read from a first and a second layer. In one embodiment, continuous reading of data from each layer is provided by performing a disconnected jump from one layer to another. In particular, the lens may be first positioned to focus on one layer and then to directly move to a second position so as to focus on a second layer. In another embodiment, such a multi layer jump is performed based on current focus error servo information. In one embodiment, the process of moving from one layer directly to a second layer involves directing the lens from a first position on a first layer to a second position on a second layer. The first position corresponds to a first focused position, such as A in FIG. 1 and the second position corresponds to a second focused position, such as B in FIG. 1.

Figure 3:
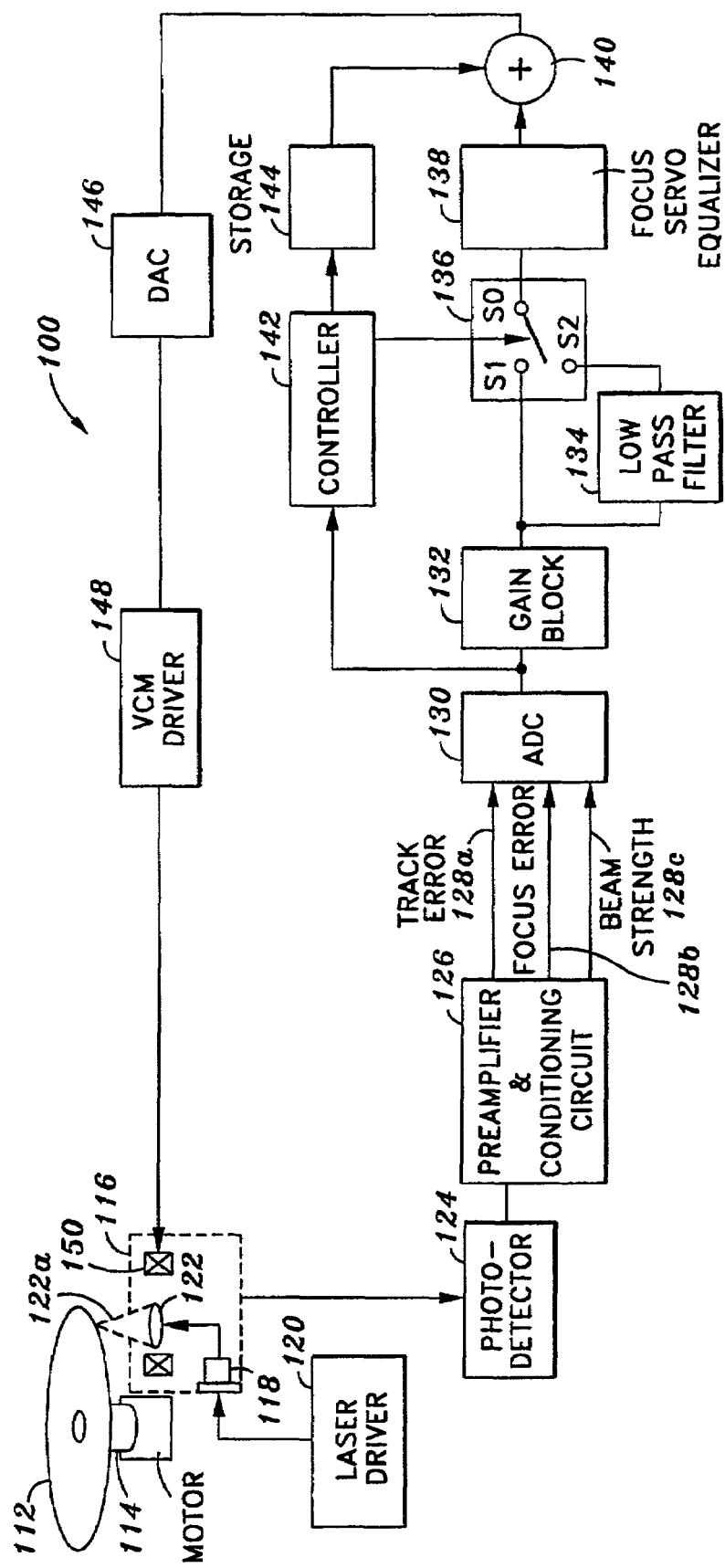
FIG. 3 illustrates one embodiment of an optical disk apparatus provided in accordance with the principles of the invention.

FIG. 3 illustrates one embodiment of an optical disk apparatus 100. The optical disk apparatus 100 includes an optical disk 112 that is rotated by a spindle motor 114. An optical pickup 116 scans the tracks on the rotating disk 112 with a laser beam. The optical pickup 116 comprises an optical system including a laser 118 that provides a light source, and an objective lens 122. The laser 118 is driven by a laser driver 120 to emit a laser beam. The laser beam is incident on the objective lens 122 via optical elements (not shown) such as a collimator lens and a beam splitter. The laser beam 122a is focused on the recording surface of the optical disk 112 by the objective lens 122 to form a small spot on the recording surface.

The light reflected from the optical disk 112 propagates back to the objective lens 122 and is separated from the incident laser beam by the beam splitter. The reflected light beam is detected by the photodetector 124. This photodetector 124 converts this reflected light beam into electric signals.

The electric signal is then provided to a preamplifier and conditioning circuit 126, which amplifies and conditions the electric signal. Based on the received electric signal, the preamplifier and conditioning circuit 126 generates a plurality of signals, including a track error signal 128a, a focus error signal 128b and a beam strength signal 128c. The beam strength signal 128c is a signal generated from either the main or the side beams of the reflected light beam, or a combination of both the main and side beams, and it represents the disc reflection of the beam spot as the optical head moves across the disc surface. The tracking error signal represents the tracking servo quality based on the reflected light beam. It is understood that additional signals may be provided by the circuit 126.

The signals 128a, 128b and 128c are converted to digital signals by an analog-to-digital converter (ADC) 130. The ADC 130 provides the tracking error signal 128a and the focus error signal 128b to a gain circuit 132, which provides gain adjustment for handling different optical pickups, such as pickup 116 having different parameters. The output of the gain circuit 132 is provided to a low pass filter 134. In one embodiment, the low pass filter 134 has a programmable pass frequency. It may be programmed to operate at a low frequency so as to provide a direct current (D.C.) signal level. The D.C. signal level enables the system to provide a D.C. hold, as described in the following sections. Switch 136 comprises two terminals, S1 and S2. It may couple either of the terminals S1 and S2 to a focus servo equalizer 138 via terminal S0. Terminal S1 is connected directly to the output of the gain block 132, while S2 is coupled to the output of the low pass filter 134. The switch 136 may, under the direction of controller 142, operate in a first mode which connects its output S0 to S1 or in a second mode, which connects its output S0 to S2. As described earlier, the output S0 of the switch 136 is provided to a focus servo equalizer 138.

Controller 142 receives input from the ADC 130, and provides control signals to switch 136. Such input includes the focus error signal 128b, which indicates whether the laser beam 122a is in a focused state. The controller 142 also generates an output that is provided to storage 144. The storage 144 may be a register or any other data storage. In one embodiment, the storage is a 256-bit register for storing values required for providing the D.C. level, and/or voltage levels required to provide the "kick", "coast" and "brake" phases of interlayer jump process, as described in detail in the following sections. The output of storage 144 and the focus servo equalizer 138 are summed by summing circuit 140, which generates an output signal that is converted back to an analog signal via digital-to-analog circuit 146. The output of the summing circuit 140 may be referred to as the focus drive output. The analog servo output signal 146 is provided to a voltage coil motor (VCM) driver 148, which supplies a drive current to the tracking actuator 150 in accordance with the servo output signal to drive the tracking actuator. The tracking actuator 150 moves the objective lens in the radial direction of the optical disk 112.

During normal operation, the controller 142 receives the track error signal 128a, focus error signal 128b and beam strength 128c information via ADC 130. It directs the switch to couple to terminal S1, so that the focus servo equalizer would receive gain information from the gain block 132, which provides closed loop data from reading the beam reflected off disk 112. The controller 142 also directs the use of various values stored in storage 144, to control and/or direct the VCM driver 148 to move the optical pickup 116 or to hold the optical pickup 116 in a certain position.

FIG. 4A illustrates one embodiment of the focus error (FE) signal during the interlayer jump process. The signal includes a curve having a first half S-curve $S_{1A}$ corresponding to a portion of the signal obtained while focusing on a first layer (such as layer 0) and a second half S-curve $S_{1B}$ corresponding to a second portion of the signal obtained while focusing on the first layer. $S_M$ represents the midpoint level of the first and second layers. FIG. 4A also illustrates the first half S curve $S_{2A}$ corresponding to a portion of the signal obtained while focusing on a second layer (such as layer 1). The peak of the half S-curves will be referred to as Sp.

FIG. 4B illustrates one embodiment of the D.C. signal level during the interlayer jump process. FIG. 4C illustrates one embodiment of the intervals of active application of the D.C. hold during the interlayer jump process. FIG. 4D illustrates one embodiment of the focus drive output (output of the summing circuit 140) during the interlayer jump process.

As described earlier, one aspect of the invention involves providing focus control while focusing the objective lens from one layer to a second layer. In one embodiment, the process of moving from one layer directly to a second layer involves directing the lens from a first position to a second position. The first position corresponds to a first focused position, such as A in FIG. 1 and the second position corresponds to a second focused position, such as B in FIG. 1. In one embodiment, for normal operations, the switch 136 is set to couple S0 to S1. Prior to initiating the interlayer jump process, the controller 142 issues a command for the switch to couple S0 to S2, so that the focus servo equalizer 138 will be coupled to the low pass filter 134. The low pass filter 134 provides a D.C. reference level Vo, to the focus servo equalizer. This is required to reduce distortion and external disturbances during the interlayer jump. In one embodiment, the Vo may be set to the gain level of the system prior to performing the interlayer jump.

To focus the laser beam 18 when moving directly from one layer to another layer, the output of the VCM 148 is first increased in accordance with the amount of voltage (for example, Vs) required to drive the objective lens 122 of the optical pickup 116 from the first layer to the second layer (see FIG. 4B). The controller 142 directs the VCM 148 to thus drive the optical pickup 116 while monitoring the focus error signal 128b (FIG. 4A). In one embodiment, when the focus error signal 128b indicates that the focus is out of the current layer (e.g., when the focus error signal is at a level corresponding to $S_M$), the controller 142 issues a command for the VCM driver 148 to "coast" or to maintain a predetermined voltage level so that it will not continue to drive the optical pickup unit 116 at Vs. In one embodiment, this is accomplished by operating the VCM driver 148 at the D.C. reference level, e.g., Vo.

The controller 142 continues monitoring the focus error signal level (see FIGS. 4A–D). When the focus error signal level indicates that the focus is progressing to the next layer (e.g., when the focus error signal indicates that it has reached a level corresponding to the beginning of the second S-curve in FIG. 5), the controller 142 initiates a "brake" phase, during which it provides a voltage of substantially the same level as that supplied to the VCM driver 148 at the "kick" phase, but in opposite polarity. That is, the controller 142 issues a control signal to retrieve a value from the storage 144, substantially equal to −Vs', and supplies this to the VCM driver 148 via DAC 146. The controller 142 continues to monitor the focus error signal level until it determines that the peak level of the next layer is detected (e.g., a level corresponding to the peak Sp of the first half S-curve $S_{2A}$ in FIG. 4A). The controller 142 will then direct the switch 136 to disable the D.C. level hold, i.e., to switch from S2 to S1, so that the focus servo equalizer 138 receives its gain information directly from the reflected beam, and so that it operates in a closed-loop mode again. The process then proceeds to normal servo operations, such as control of the disc motor servo, track servo, etc.

Figure 5A:
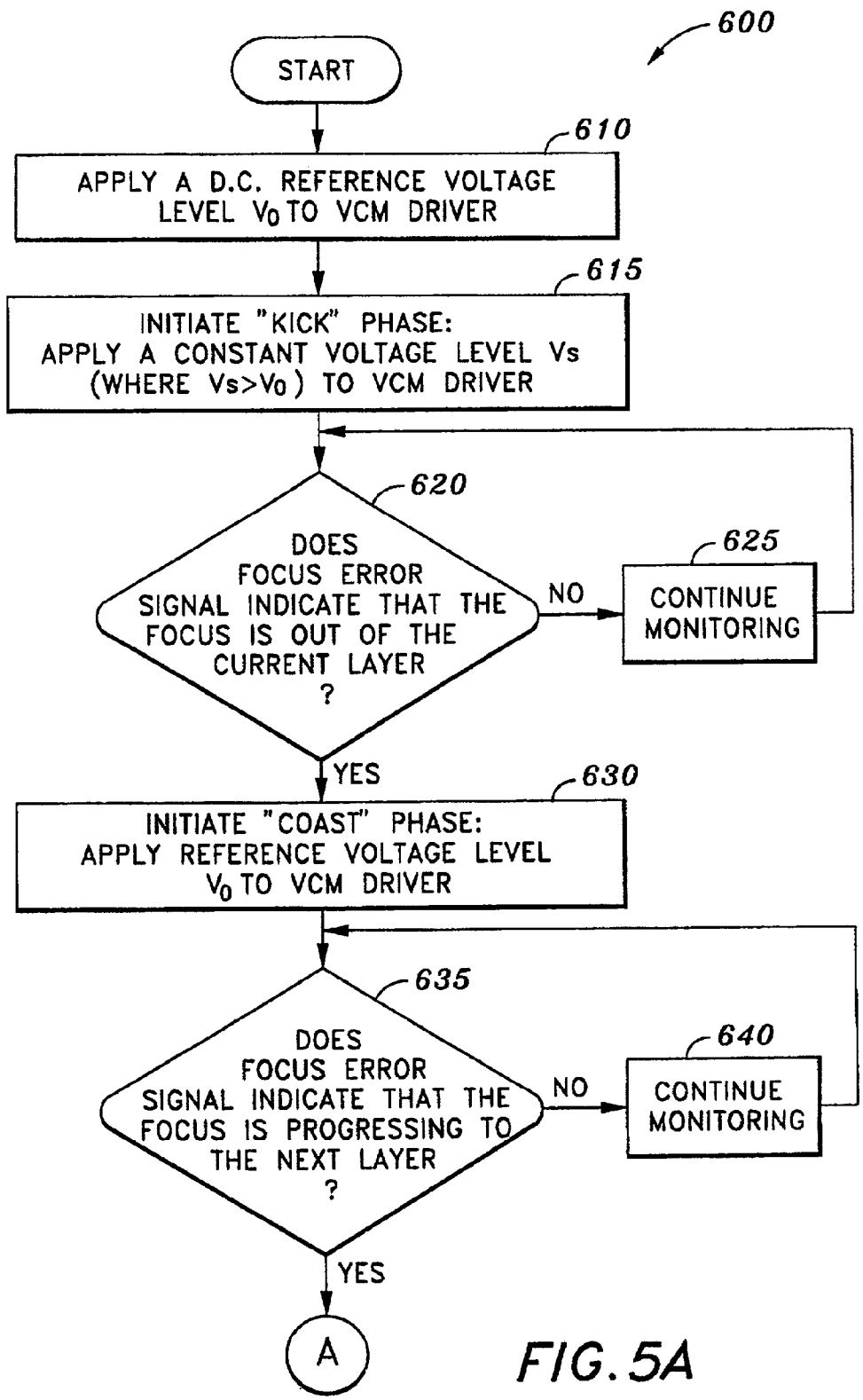
FIGS. 5A and 5B are flow charts illustrating one embodiment of the interlayer jump process.
Figure 5B:
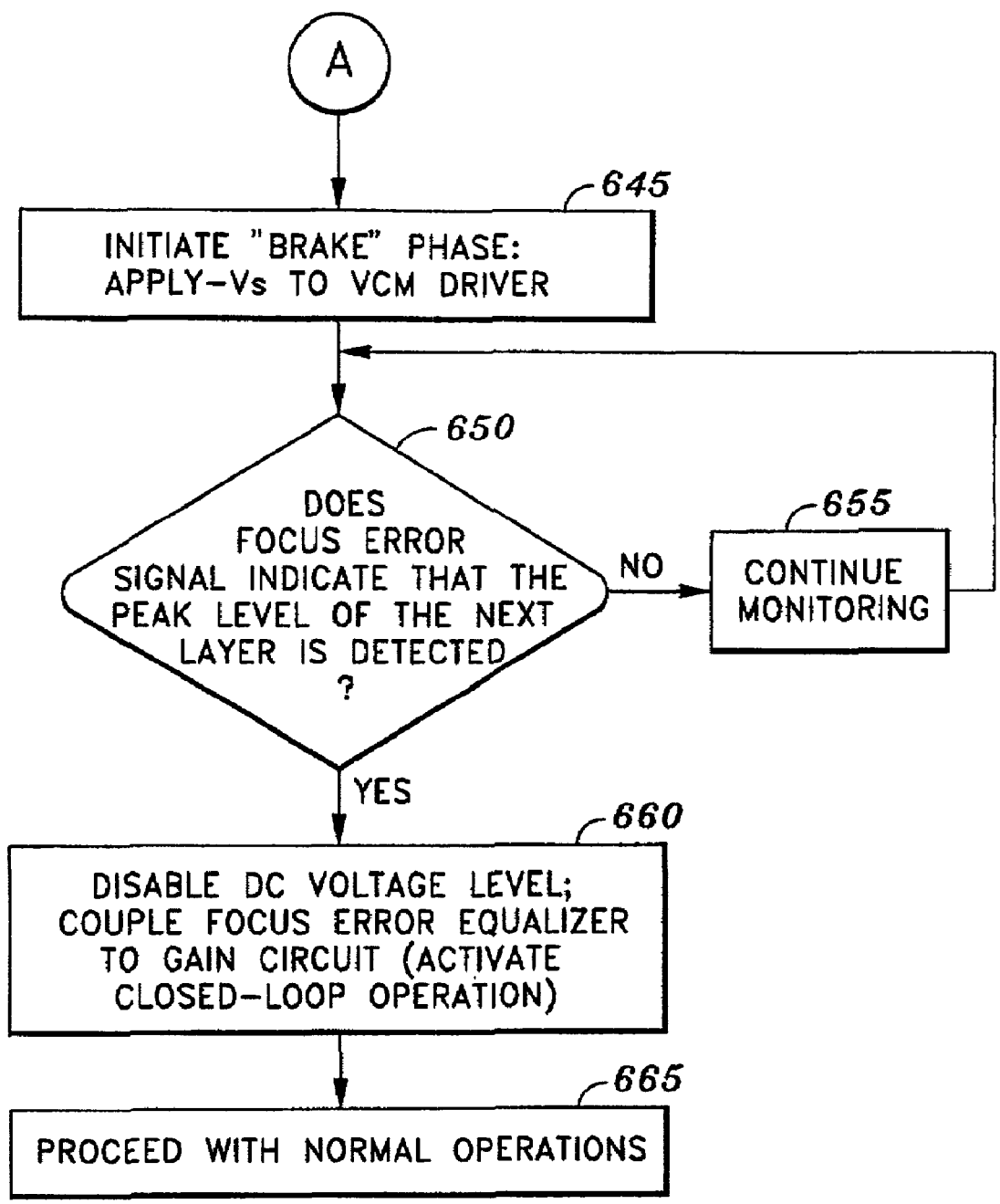

FIGS. 5A and 5B are flow charts illustrating one embodiment of the interlayer jump process 600. Proceeding from a start state, a D.C. voltage level Vo is applied to the VCM driver (or focus driver) driving the optical pickup 116 that includes the objective lens 122 (see FIG. 3), as shown in process block 610. In one embodiment, the D.C. level is of a predetermined amount, substantially equivalent to the focus servo signal level required for focusing the laser beam 122a on a current layer. This is required to reduce distortion and external disturbances during the interlayer jump. In one embodiment, this may be accomplished by the controller 142 directing the switch 136 to couple terminals S0 to S2, whereby the focus servo equalizer will be coupled to the low pass filter 134. The low pass filter may be pre-programmed to operate at a low frequency to provide the D.C. voltage level. For present discussion purposes, the D.C. voltage level is referred to as a reference voltage level Vo. At the conclusion of the interlayer jump, the focus servo equalizer 138 is activated, by switching to S1, so that the D.C. hold for providing the D.C. voltage level is disabled.

Once the D.C. hold has been activated, the interlayer jump may proceed. The first phase of the jump involves a "kick", during which a constant, predetermined voltage level Vs (having a magnitude that is greater than the voltage reference level Vo) is applied to the VCM driver 148 so as to drive the optical pickup 116 to the second position or second layer (process block 615). The controller 142 determines if the focus error signal 128b indicates that the focus is out of the first position or the current layer. In one embodiment, this occurs when the focus error signal level substantially completes the first S-curve of a sine curve (see FIG. 4). That is, the focus error signal is substantially at the mid-point $S_M$ of a sine wave, between the two S-curves of the sine wave.

The controller 142 is continuously monitoring the focus error signal, and determines if the focus error signal indicates that the focus is out of the current layer (i.e., if the objective lens 122 has been moved away from focusing on the current layer), as shown in process block 620. If the focus is still on the current layer, the process 600 proceeds to process block 625 to continue monitoring. Otherwise, the "coast" phase is initiated, where the reference voltage level Vo is applied to the VCM driver (process block 630). This phase is illustrated in FIGS. 4A–D.

Proceeding from process block 630, the controller 142 determines if the focus error signal indicates that focus is progressing to the next layer, as shown in decision block 635. If not, the process 600 proceeds to process block 640, where it continues monitoring the focus error signal. Otherwise, the "brake" phase is initiated, where a voltage level of −Vs' is applied, as shown in process block 645. This voltage has the same magnitude as that applied during the "kick" phase, but with opposite polarity. In an alternate embodiment, a voltage level having a magnitude greater or less than Vs may be applied (but of opposite polarity), according to design or implementation requirements. Next, the controller 142 determines if the focus error signal indicates that the peak level Sp of the next layer has been detected, as shown in decision block 650. If not, the process 600 continues monitoring the focus error signal, as shown in process block 655. Otherwise, the controller 142 issues a command to switch 136 to decouple from S2, and to couple to S1. This effectively disables the D.C. hold, and couples the focus servo equalizer 138 to the gain block, essentially activating a closed-loop operation (process block 660). Once the required focus on the next layer is achieved, process 600 proceeds with normal operations.

The two variables involved in the interlayer jump operation are the amplitude of the D.C. signal level and time. As a result, many different alternative approaches to the process described above may be implemented. For example, if the amplitude of the voltage applied during the "kick" phase is increased, the duration of the "kick" phase may be reduced.

Through the implementation of the invention, focus control may be provided during interlayer jumps on a multi-layer disk. The execution time of such a process is less than 20 ms, and typically may be accomplished under 10–20 ms. As a result, system performance is enhanced.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed:

1. A system for providing focus control in a multi-layer optical storage medium, comprising:
    a light source that generates a beam of light;
    an optical disk having a first and a second optical layer, the optical disk reflects the beam of light off one of said first and said second optical layers;
    a detector for receiving the reflected beam;
    a controller circuit coupled to the detector, said control circuit to provide a servo signal in response to said reflected beam;
    a conditioning circuit coupled between said detector and said controller, said conditioning circuit to provide a focus signal to said controller circuit based on said reflected beam;
    a gain circuit and a hold circuit, said gain circuit to provide an output signal representing current servo information and said hold circuit to provide an output signal representing predetermined servo information, wherein said controller selects one of said output signals as said servo signal based on said focus signal; and
    a driver circuit coupled to said controller circuit and said light source, said driver circuit to direct said light source to move from a first position to a second position based on said servo signal, so as to focus said light source from one of said first or said second optical layer to another one of said first or said second optical layer.

2. The system as recited in claim 1 further comprising a storage coupled to said controller, said storage containing values for providing said predetermined servo information.

3. The system as recited in claim 2, wherein said values include a first predetermined value corresponding to a previously current servo value, a second predetermined value corresponding to an amount of voltage required to drive said light source from said first position to said second position, and a third value corresponding to a reverse of said second predetermined value.

4. The system as recited in claim 3, wherein said first value is provided when said controller determines that a process to move said light source from said first position to said second position is initiated.

5. The system as recited in claim 3, wherein said second value is provided when said controller determines that focus is progressing from said first layer to said second layer.

6. The system as recited in claim 3, wherein said third value is provided when said controller determines that said light source is not focused on said first layer.

7. The system as recited in claim 3, wherein said first value is provided when said controller determines that said light source is focusing on said second layer.

8. The system as recited in claim 7, wherein said output signal from said gain circuit is provided when said light source is focused on said second layer.

9. A method for providing focus control in a multi-layer optical storage medium, comprising:
    generating a beam of light;
    reflecting said beam of light off one of a first and a second optical layers on a disk;
    detecting the reflected beam;
    providing a focus signal based on said reflected beam;
    storing values for providing predetermined servo information, wherein said values include a first predetermined value corresponding to a previously current servo value, a second predetermined value corresponding to an amount of voltage required to drive said light source from said first position to said second position, and a third value corresponding to a reverse of said second predetermined value;
    providing one of an output signal representing current servo information or an output signal representing said predetermined servo information, said output signal provided as a servo signal in response to said focus signal;
    directing said light source to move from a first position to a second position based on said servo signal, so as to focus said light source from one of said first or said second optical layer to another one of said first or said second optical layer.

10. The method as recited in claim 9, wherein said first value is provided when said controller determines that a process to move said light source from said first position to said second position is initiated.

11. The method as recited in claim 9, wherein said second value is provided when said controller determines that focus is progressing from said first layer to said second layer.

12. The method as recited in claim 9, wherein said third value is provided when said controller determines that said light source is not focused on said first layer.

13. The method as recited in claim 9, wherein said first value is provided when said controller determines that said light source is focusing on said second layer.

14. The method as recited in claim 13, wherein said output signal representing current servo information is provided when said light source is focused on said second layer.

* * * * *